(12) United States Patent
Pizlo

(10) Patent No.: US 8,631,051 B2
(45) Date of Patent: Jan. 14, 2014

(54) HYBRID FRAGMENTING REAL TIME GARBAGE COLLECTION

(76) Inventor: Filip Pizlo, Indianapolis, IN (US)

( * ) Notice: Subject to any disclaimer, the term of this patent is extended or adjusted under 35 U.S.C. 154(b) by 1149 days.

(21) Appl. No.: 12/564,691

(22) Filed: Sep. 22, 2009

(65) Prior Publication Data

US 2010/0077172 A1    Mar. 25, 2010

Related U.S. Application Data

(60) Provisional application No. 61/192,734, filed on Sep. 22, 2008.

(51) Int. Cl.
*G06F 12/00* (2006.01)

(52) U.S. Cl.
USPC ............ 707/813; 711/170; 711/E12.001; 711/E12.002; 707/816

(58) Field of Classification Search
USPC ........... 711/170, E12.001, E12.002; 707/813, 707/816
See application file for complete search history.

(56) References Cited

U.S. PATENT DOCUMENTS

| 6,047,295 | A | 4/2000 | Endicott et al. |
|---|---|---|---|
| 6,865,585 | B1 | 3/2005 | Dussud |
| 7,155,467 | B1 * | 12/2006 | Rohrs ................................. 1/1 |
| 2005/0132374 | A1 | 6/2005 | Flood et al. |
| 2005/0166028 | A1 | 7/2005 | Chung et al. |
| 2006/0294165 | A1 | 12/2006 | Bacon et al. |
| 2007/0022149 | A1 | 1/2007 | Bacon et al. |
| 2007/0100919 | A1 | 5/2007 | Lee et al. |
| 2008/0281886 | A1 | 11/2008 | Petrank et al. |
| 2009/0037684 | A1 | 2/2009 | Obata et al. |
| 2009/0144712 | A1 | 6/2009 | Steensgaard et al. |
| 2009/0222494 | A1 | 9/2009 | Pizlo et al. |
| 2009/0222634 | A1 | 9/2009 | Pizlo et al. |
| 2010/0049938 | A1 | 2/2010 | Izumi et al. |
| 2010/0077170 | A1 | 3/2010 | Adachi et al. |

FOREIGN PATENT DOCUMENTS

KR    2007-047193    4/2007

OTHER PUBLICATIONS

International Preliminary Report on Patentability dated Mar. 22, 2011, International Application No. PCT/US2009/057863, 5 pgs.
International Search Report for PCT/US2009/057863, 7 pages.

(Continued)

*Primary Examiner* — Jasmine Song
(74) *Attorney, Agent, or Firm* — Faegre Baker Daniels LLP

(57) ABSTRACT

A method of managing memory, and a system implementing the method, are disclosed herein. In one embodiment according to the invention, the method comprises the step of allocating a first space, a first semi-space and a second semi-space of a memory unit. The first space has a first space size, and the first and second semi-spaces have a semi-space size. The first object is transformed into a plurality of elements and a spine containing pointers to the plurality of elements. The plurality of elements are stored in the first space and the spine in one of the first semi-space and the second semi-space. First memory portions of the first space are reclaimed using a mark-sweep policy and second memory portions of one of the first semi-space and the second semi-space are reclaimed using a moving policy.

31 Claims, 9 Drawing Sheets

(56) References Cited

OTHER PUBLICATIONS

Armbruster, Austin; Baker, Jason; Cunei, Antonio; Flack, Chapman; Holmes, David; Pizlo, Filip; Pla, Edward; Prochazka, Marek; Vitek, Jan; "A Real-Time Java Virtual Machine with Applications in Avionics," presented at the 12th IEEE Real-Time and Embedded Technology and Applications Symposium (RTAS 2006), *ACM Transactions on Embedded Computing Systems (TECS)*, Dec. 2007, vol. 7, No. 1, ACM, New York, NY, USA.

Baker, J.; Cunei, A.; Kalibera, T.; Pizlo, F.; Vitek, J.; "Accurate Garbage Collection in Uncooperative Environments Revisited," *Concurrency and Computation: Practice and Experience*; revised Mar. 5, 2008, Concurrency Computat.: Pract. Exper. 2006; 00:1-7; John Wiley & Sons, Ltd.

Baker, Jason; Cunei, Antonio; Flack, Chapman; Pizlo, Filip; Prochazka, Marek; Vitek, Jan; Armbruster, Austin; Pla, Edward; Holmes, David; "A Real-Time Java Virtual Machine for Avionics: An Experience Report," rtas, pp. 384-396, 12th IEEE Real-Time and Embedded Technology and Applications Symposium (RTAS'06), 2006.

Baker, Jason; Cunei, Antonio; Pizlo, Filip; Vitek, Jan; "Accurate Garbage Collection in Uncooperative Environments with Lazy Pointer Stacks," 2007, Computer Science Department, Purdue University, West Lafayette, Indiana.

Cheng, Perry; Blelloch, Guy E.; "A Parallel, Real-Time Garbage Collector," *PLDI* 2001, Jun. 2001, Snowbird, Utah.

Click, Cliff; Tene, Gil; Wolf, Michael; "The Pauseless GC Algorithm," *VEE '05*, Jun. 11-12, 2005, ACM, New York, NY, USA.

Doligez, Damien; Gonthier, Georges; "Portable, Unobtrusive Garbage Collection for Multiprocessor Systems," *Proceedings of the 21st AnnualACM SIGPLAN-SIGACT Symposium on Principles of Programming Languages*, Jan. 1994, pp. 70-83.

Doligez, Damien; Leroy, Xavier; "A Concurrent, Generational Garbage Collector for a Multithreaded Implementation of ML," *Proceedings of the 20th Symposium Principles of Programming Languages*, 1993, pp. 113-123.

Pirinen, Pekka P., "Barrier Techniques for Incremental Tracing," ISMM '98, Oct. 1998, Vancouver, B.C.

Pizlo, F.; Fox. J. M.; Holmes, D.; Vitek, J.; "Real-Time Java Scoped Memory: Design Patterns and Semantics," *Seventh IEEE International Symposium on Object-Oriented Real-Time Distributed Computing*; May 2004.

Pizlo, Filip; Frampton, Daniel; Petrank, Erez; Steensgaard, Bjarne; "Stopless: A Real-Time Garbage Collector for Multiprocessors," *ISMM 2007*, 2007, Montreal, Canada.

Pizlo, Filip; Hosking, Anthony L.; Vitek, Jan; "Hierarchical Real-time Garbage Collection," *Proceedings of the 2007 LCTES conference*, ACM SIGPLAN; Jul. 2007; pp. 123-133; vol. 42, Issue 7; ACM, New York, NY, USA.

Pizlo, Filip; Petrank, Erez; Steensgaard, Bjarne; "A Study of Concurrent Real-Time Garbage Collectors," *PLDI '08*; Jun. 7-13, 2008; ACM, New York, NY, USA.

Pizlo, Filip; Petrank, Erez; Steensgaard, Bjarne; "Path Specialization: Reducing Phased Execution Overheads," *ISMM '08*, Jun. 7-8, 2008; ACM, New York, NY, USA.

Pizlo, Filip; Vitek, Jan; "An Emprical Evaluation of Memory Management: Alternatives for Realtime Java," *Proceedings of the 27th IEEE International Real-Time Systems Symposium*; 2006; pp. 35-46; ACM, New York, NY, USA.

Pizlo, Filip; Vitek, Jan; "Memory Management for Real-time Java: State of the Art," *Proceedings of the 2008 11th IEEE Symposium on Object Oriented Real-Time Distributed Computing*; pp. 248-254; May 2008; IEEE Computer Society; Washington, DC, USA.

Pizlo, Filip; Ziarek, Lukasz; Vitek, Jan; "Poster Abstract: fVM, a hard real-time Java implementation for cyber-physical systems," http://www.cs.purdue.edu/homes/lziarek/posterAb.pdf; last downloaded Sep. 2009.

Pizlo, Filip; Ziarek, Lukasz; Vitek, Jan; "Real Time Java on resource-constrained platforms with Fiji VM," *TRES '09*, Sep. 23-25, 2009, Madrid, Spain; ACM, New York, NY, USA.

Schoeberl, Martin; "Real-Time Garbage Collection for Java," *Ninth IEEE International Symposium on Object and Component-Oriented Real-Time Distributed Computing* (ISORC'06), 2006; pp. 424-432.

Schoeberl, Martin; Vitek, Jan; "Garbage Collection for Safety Critical Java," *JTRES '07*, Sep. 26-28, 2007, Vienna, Austria.

Siebert, Fridtjof, Dr.; "Realtime Garbage Collection in the JamaicaVM 3.0," *JTRES '07*, Sep. 26-28, 2007, Vienna, Austria; ACM, New York, NY, USA.

Spring, Jesper Honig; Pizlo, Filip; Guerraoui, Rachid; Vitek, Jan; "Reflexes: Abstractions for Highly Responsive Systems," *VEE '07*, Jun. 13-15, 2007;San Diego, California; ACM, New York, NY, USA.

Spring, Jesper Honig; Pizlo, Filip; Privat, Jean; Guerraoui, Rachid; Vitek, Jan; "Reflexes: Abstractions for Integrating Highly Responsive Tasks into Java Applications," *Proceedings of the 3rd international conference on Virtual execution environments*; San Diego, California; 2007; pp. 191-201; ACM, New York, NY, USA.

Wang, Andy Juan; Baglodi, Venkatesh; "Evaluation of Java Virtual Machines for Realtime Applications," *Journal of Computing Sciences in Colleges*; Mar. 2002; pp. 164-178; vol. 17; Issue 4; Consortium for Computing in Small Colleges; USA.

\* cited by examiner

HYBRID FRAGMENTING REAL TIME GARBAGE COLLECTION

CROSS REFERENCE TO RELATED APPLICATION

The present application claims the benefit of U.S. Provisional Patent Application No. 61/192,734 filed Sep. 22, 2008, titled "HYBRID FRAGMENT REAL-TIME GARBAGE COLLECTION," the entire disclosure of which is expressly incorporated herein by reference.

FIELD OF THE DISCLOSURE

The disclosure relates generally to memory management in computing systems. In particular, the disclosure concerns memory management methods and systems implementing those methods.

BACKGROUND

Modern software relies on manual or automatic memory managers to organize random-access-memory (referred to herein as RAM or memory). Manual memory managers offer good performance but are error-prone and require additional programmer effort. Automatic memory managers, called garbage collectors, remove much of the burden from the programmer, leading to increased productivity and stronger correctness guarantees. Typical costs associated with automatic memory management are greater space usage and unpredictable performance due to software stalling for long periods while memory is reorganized by the garbage collector.

Most software is designed for overall speed where slow responsiveness of any particular operation is acceptable. Systems that utilize real-time software, on the other hand, such as avionics, satellite control, ship-board computing, nuclear reactor control, automatic defibrillator devices, and the like, depend on predictable performance of every operation. Recent advancements in real-time garbage collection technology have reduced pause times to 200 microseconds or less by increasing memory usage. Though these systems guarantee the timeliness of the garbage collector, they do so using an unbounded amount of memory. Improvements are needed to collect garbage in memory with memory space and time boundaries.

SUMMARY

A method of managing memory, and a system implementing the method, are disclosed herein. In one embodiment according to the invention, the method comprises the step of allocating a first space, a first semi-space and a second semi-space of a memory unit. The first space has a first space size, and the first and second semi-spaces have a semi-space size. The method further comprises the step of transforming a first object into a plurality of elements and a spine. The elements are equally sized. The spine contains references to the plurality of elements. The method further comprises the step of storing the plurality of elements in the first space and the spine in one of the first semi-space and the second semi-space. Finally, the method comprises the steps of reclaiming first memory portions of the first space using a mark-sweep policy and reclaiming second memory portions of one of the first semi-space and the second semi-space using a moving policy.

In another embodiment according to the invention, a machine having hard real-time processing capabilities comprises a memory unit, a first processing sequence and a second processing sequence. The memory unit has a first space, a first semi-space and a second semi-space allocated therein. The first space has a first space size, and the first and second semi-spaces having a semi-space size. The first processing sequence is configured to transform a first object into a plurality of equally sized elements and a spine, to store the plurality of elements in the first space, and to store the spine in one of the first semi-space and the second semi-space. The second processing sequence is configured to reclaim a first memory portion of the first space according to a mark-sweep policy and a second memory portion of one of the first and the second semi-spaces according to a moving policy.

In a further embodiment according to the invention, a computing device having hard real-time processing capabilities comprises a memory unit, a first processing sequence and a second processing sequence. The memory unit has a first space, a first semi-space and a second semi-space allocated therein. The first space has a first space size, and the first and second semi-spaces having a semi-space size. The first processing sequence is configured to transform a first object into a plurality of equally sized elements and a spine, to store the plurality of elements in the first space, and to store the spine in one of the first semi-space and the second semi-space. The second processing sequence is configured to reclaim a first memory portion of the first space according to a mark-sweep policy and a second memory portion of one of the first and the second semi-spaces according to a moving policy.

BRIEF DESCRIPTION OF THE DRAWINGS

The above-mentioned and other disclosed features, and the manner of attaining them, will become more apparent and will be better understood by reference to the following description of disclosed embodiments taken in conjunction with the accompanying drawings, wherein.

Figure 1:
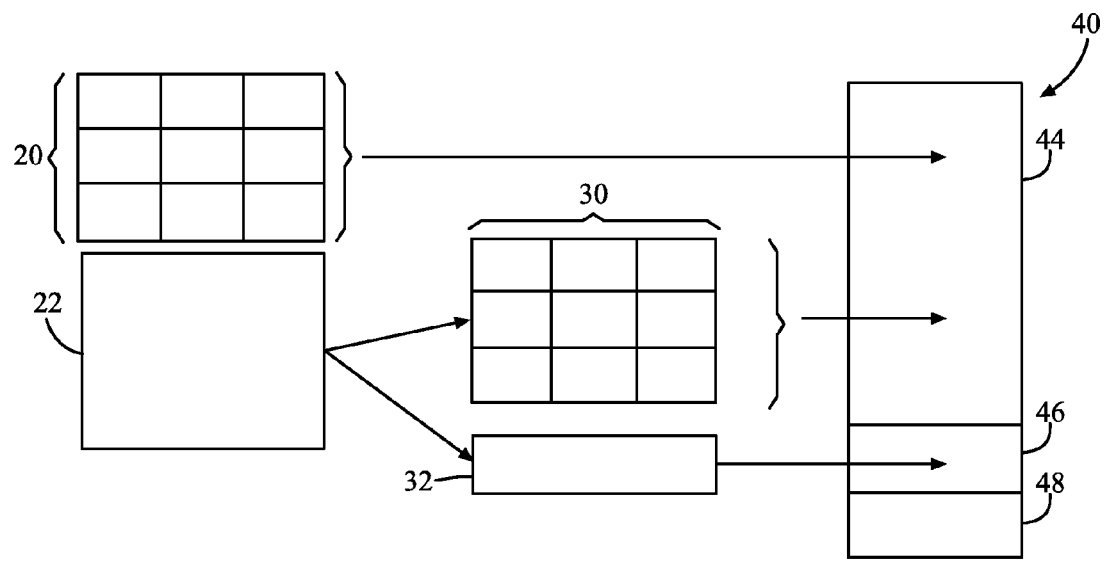
FIG. 1 is a block diagram conceptually illustrating allocation of objects to memory by a hybrid fragmenting collector according to one embodiment of the invention.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Two known collectors are semi-space, or moving, collectors and mark-sweep collectors. Mark-sweep collectors may cause unpredictable pauses in the operation of an application and may also increase memory requirements beyond acceptable limits for real-time systems due to fragmentation that may occur inadvertently. These problems may be caused by objects which are not handled efficiently by mark-sweep collectors such as large objects, e.g., arrays. Moving collectors require two-fold space for any data stored and incur high overhead for accesses to data if the data is in motion. A hybrid fragmenting collector according to one embodiment of the invention solves the above-identified problems by treating simple objects differently from complex, e.g., arrays, objects. A mark-sweep policy is implemented for small objects to provide predictability. Complex objects are divided into arraylets comprising elements and lookup tables, or spines, containing pointers to the elements. The elements are treated like small objects therefore avoiding fragmentation problems, and a moving policy is implemented for the spines only to minimize the space overhead. The high overhead for accesses to data is eliminated because the spines are immutable. When the spines are moved, both the original and the copy will be identical. Hence, the application does not need to take additional steps to identify which version to access because both are equally valid. Due to these advantages, the hybrid collection method may be used in hard real-time computing system.

A mark-sweep policy and a moving policy are implemented in the hybrid collector. Both policies are concurrent and/or incremental and may be parallelized using already known techniques. Both policies are collected together in one step, allowing for arbitrary pointers between objects stored using those policies. The mark-sweep policy handles fixed-size objects only. The mark-sweep policy is concurrent in the style of Doligez-Leroy-Gonthier (DLG). Either hard or soft handshakes may be used, with priority boosting for the progress guarantee. Stacks are scanned using sliding views so that the maximum pause time is determined only by one stack's height. First objects, such as arrays and, optionally, any object, are allocated by splitting them into fixed-size elements. The elements may be sized as chunks in which case they are linked by pointers and allocated with the mark-sweep policy. Each object is organized as a linked structure (for example, a linked list) consisting of one or more chunks, with one distinguished "root chunk" that the program uses to refer to the object. Any data in the root chunk can be accessed without a performance penalty while data in other chunks may require one or more "hops" from the root.

The semi-space policy is made concurrent by taking advantage of object immutability. The DLG initial stack scan is used to determine roots, after which objects are moved without the application's knowledge. The application may continue to refer to from-space throughout the collection process except in the case of new objects and references loaded from the heap. Heap references to the semi-space objects are fixed up by hooking into the DLG trace routine. After all objects are moved, the mark phase is complete, and all references are fixed, a second (sliding views) stack scan is requested to fixup stacks. The only barrier is the DLG write barrier, except potentially replication for array initialization (see below). Arrays, or large objects, are represented as a variable-size lookup table allocated with the semi-space policy, with the data boxed in fixed-size chunks allocated using the mark-sweep policy. The lookup table is initialized by having each pointer refer to the appropriate element. The lookup table is only written to during large object initialization, and each field of the table is only written once. Data within the fixed-size elements is fully mutable. If array allocation is not atomic, the initialization of the lookup table will use a replicating write barrier in the style of Cheng and Blelloch—it will be lock-free and will rely on the write-once rule for immutable object fields. The lookup table may thus require a Brooks forwarding pointer, but not a Brooks barrier.

Scheduling is up to the user. This design is scheduler-agnostic, and may be implemented using known techniques such as work-based, time-based, or stack-based. Stack-based scheduling would have a worst-case pause time determined by the cost of scanning a single thread's stack. This could be reduced further using known techniques such as stacklets. Since copying can be fully concurrent, the size of objects in the semi-space has no bearing on pause time. The hybrid collector may be implemented in any managed memory system, and is advantageously used in managed memory systems requiring a bounded amount of space and wait-free access. Although heap memory is described herein as being allocated and therefore seemingly having a fixed size, a programmer may choose to assess on an event or time-based basis to re-allocate heap memory thereby creating a dynamic hybrid collector implementation.

An exemplary embodiment of a hybrid collection method and system according to the invention will now be described with reference to the figures. In an exemplary embodiment described herein, the collector manages heap memory (also referred to as "heap") using variables to track to define, select and use a semi-space. The following global variables are provided in the exemplary embodiment disclosed herein to illustrate one method of reclaiming heap memory. Other variables and techniques may also be used to perform the functions of the variables described herein without in any way limiting the invention. The global variables are accessed by the collector. The application accesses the variables using procedures provided by the collector as described with reference to FIGS. 10 and 11.

Elements and chunks may be equally or unequally sized. In one embodiment, elements and chunks are equally sized. In another embodiment, elements are smaller than chunks. Multiple elements are then combined such that the combination size is about, but not larger than, the size of a chunk. This enables programmer flexibility since the processing sequence which transforms complex objects into elements and spines does not need to be limited to a chunk size. In an alternative embodiment, elements are larger than chunks and are partitioned by another processing sequence which then stores the chunks of the elements in the same manner as it stores any other chunk.

In a further embodiment, all objects, simple and complex, are treated as complex objects. In this embodiment, even simple objects are stored as chunks and spines to obviate the step of determining whether an object is a first or second type of object. The spines are stored in semi-space and managed according to the moving policy and the chunks are stored in a first space which is managed by the mark-sweep policy.

FIG. 1 is a block diagram conceptually illustrating allocation of objects to memory by a hybrid fragmenting collector according to one embodiment of the invention. A plurality of objects 20 stored in fragmented space 44 of heap memory 40. Object 22 is organized into a plurality of chunks 30, stored in fragmented space 44, of an arraylet indexed by spine 32 which is stored in semi-space 46. Object 22, referred to as a first object, may be an array, a large object and a variably sized object, for example. A large object differs from a small object in that its size exceeds a predetermined sized arbitrarily selected by the programmer to satisfy performance objectives. If the programmer knows that an application has many objects larger than a particular size, the programmer may choose to treat those objects as first objects. Alternatively, the programmer may use the predetermined size threshold to treat some objects larger than the particular size in one way, and even larger objects in a different way. Heap memory in fragmented space 44 is reclaimed according to a fragmenting mark-sweep policy and heap memory in semi-space 46 is reclaimed according to a moving policy. Semi-space 48 is sized similarly to semi-space 48 and is provided to copy objects from semi-space 46, and vice-versa, according to the moving policy. The semi-space size may be allocated based on the expected size of the first objects (objects transformed into spines and elements) which the programmer may estimate. If the application requires x number of arrays having a maximum size y, for example, the size of the plurality of first objects would be x*y. If the programmer chooses to transform all objects, then the size of the plurality of first objects would be equal to the sum of all objects times the average size of the objects. The semi-space size may be allocated as the expected size of the first objects times the ratio of the pointer size divided by the chunk size. In one embodiment, the pointer size is one-fourth the size of chunk size. If the expected size of the first objects is used to define the size of the heap, then the semi-space size may be based on the ratio times the heap size.

Figure 2:
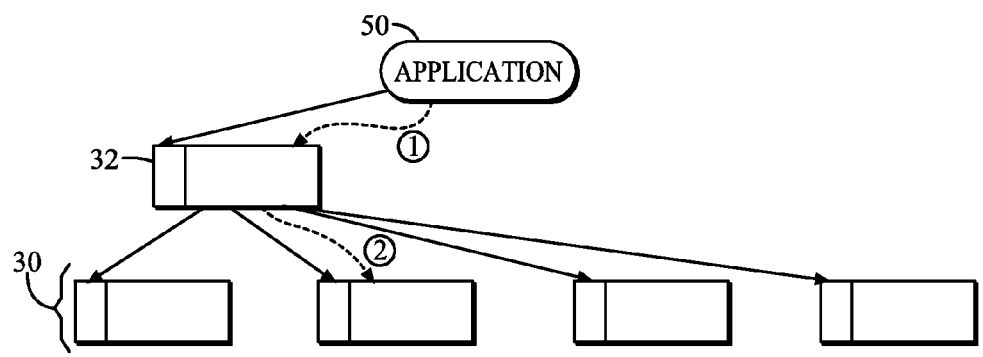
FIG. 2 is a block diagram conceptually illustrating hops for accessing elements of an object with the hybrid collector of FIG. 1.

FIG. 2 is a block diagram conceptually illustrating hops for accessing chunks of object 22 by application 50. Advantageously, the division of arrays and large objects into arraylets reduces the number of hops required by application 50 to access the object. Only two hops are needed to access any portion, or chunk, of object 32—one to access spine 32 and another to access one of four chunks 30. Circled numeral 1 illustrates the first hop and circled numeral 2 illustrates the second hop, where application 50 accesses the second of four chunks 30.

Figure 3:
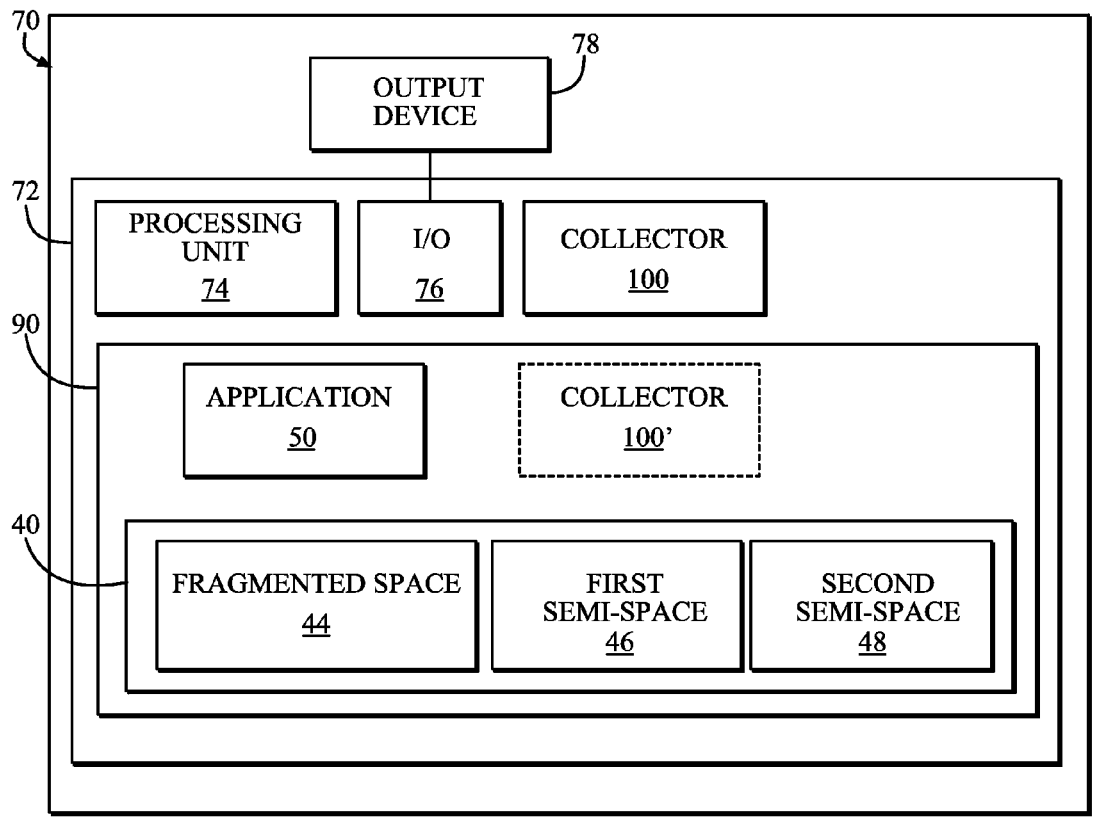
FIG. 3 is a block diagram depicting a machine including the hybrid collector of FIG. 1.

FIG. 3 is a block diagram depicting machine 70 including computing device 72 which comprises processing unit 74 configured to process instructions in processing sequences which comprise application 50 or imbedded in collector 100 or 100'. Application 50 is stored in memory storage 90. A collector may be provided in hardware or in software. Collector 100' is illustrated in phantom representing a software implementation of hardware collector 100. Both versions perform the same functions and are referred with reference to FIGS. 4 to 13 as "collector 100". Memory storage 90 includes a portion denoted by numeral 40 as heap memory. Heap memory 40 includes fragmented space 44, first semi-space 46 and second semi-space 48. Computing device 72 further includes I/O interface 76 which is operably coupled to output device 78. Exemplary machines 70 include any device having restricted memory storage 90, e.g., a telephone, a weapon, a vehicle, and any other device having an output device 78. Exemplary output devices 78 include communication integrated circuits, keypads, displays, audible output devices, printers, plotters, antenna arrays, weapons guiding systems, transmitters, receivers, and the like. Exemplary output devices 78 further include any device having controllers receiving inputs and outputting control or power signals to actuate another device, e.g., motor controllers, temperature controllers, flow controllers, load controllers, communication controllers, and the like. In an alternative embodiment, fragmented space 44 may store chunks of elements. Generally, fragmented space 44 may be referred to as a first space without requiring that simple objects be fragmented and is to be differentiated from first and second semi-spaces 46 and 48.

Figure 4:
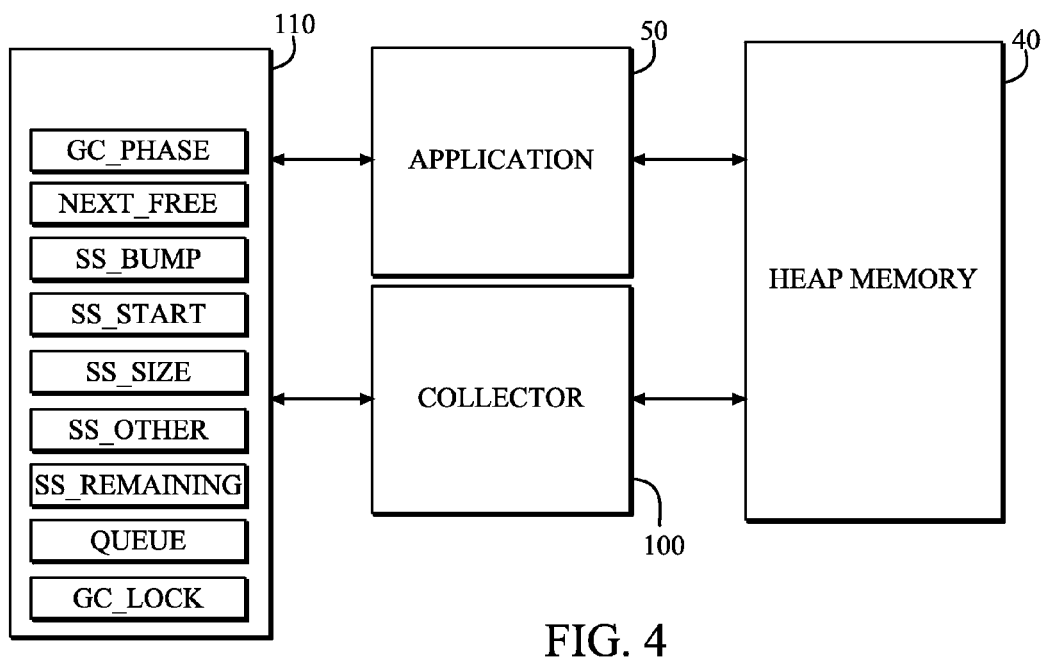
FIG. 4 is a block diagram illustrating a relationship between the collector of FIG. 1 and heap memory.

FIG. 4 is a block diagram illustrating a relationship between application 50, collector 100, heap memory 40, and several variables utilized by collector 100 and application 50 which are listed in box 110. It should be understood that the block diagram illustrates a representative relationship and that the functionality of the collector described herein may be implemented in systems having a plurality of applications accessing heap memory using threads and a plurality of processing units operating in parallel fashion. The variables will now be described sequentially, and their utility will be described later with reference to FIGS. 10 and 11.

The variable GC_PHASE tracks collector phases. In the embodiment disclosed herein, the variable values include IDLE, INIT, TRACE, and SWEEP. The variable GC_PHASE is queried by the application when performing heap modifications.

The variable NEXT_FREE points to the next free chunk. The variable NEXT_FREE is used by the application when allocating objects.

The variable SS_BUMP is a semi-space bump pointer and is used by both the application and the collector to allocate objects in a selected semi-space. The value of SS_BUMP may be SS_BUMP>=SS_START and SS_BUMP<SS_START+ SS_SIZE. SS_BUMP is constrained by the following equations:

SS_BUMP>=SS_START and
SS_BUMP<SS_START+SS_SIZE.

The variable SS_START identifies the start address of the current semi-space which may be the start address of the first semi-space or the start address of the second semi-space.

The variable SS_SIZE holds the size of the first and second semi-spaces and is defined by the collector. In one embodiment, the size of each semi-space is about 10% of the size of the heap. In alternative embodiments, particularly in applications with few arrays, the size of each semi-space may be smaller. In applications requiring many arrays, the size of the semi-space may be larger than 10% of the size of the heap.

The variable SS_OTHER identifies the start address of the other semi-space. If SS_START points at the first semi-space, then SS_OTHER points at the start of the second semi-space, and vice-versa.

The variable SS_REMAINING is used by the collector to ensure the collector has enough space for copying. The application can only allocate an SS_REMAINING amount. The collector resets the value of SS_REMAINING once copying is complete.

The variable QUEUE refers to the first object on the collector's trace queue which is the next object that the collector will scan. In the embodiment disclosed herein the collector's queue follows a LIFO discipline. The queue may also follow a FIFO policy, a randomized policy or any other queuing policy.

The variable GC_LOCK prevents modification of collector data structures to prevent malfunctions. In the embodiment disclosed herein the locking function is implemented in software. In alternative embodiments, the lock may be implemented with hardware synchronization. Exemplary hardware synchronization instructions include the Intel i486 CMPX-CHG instruction and the PowerPC LWARX/STCWX instruction.

Figure 5:
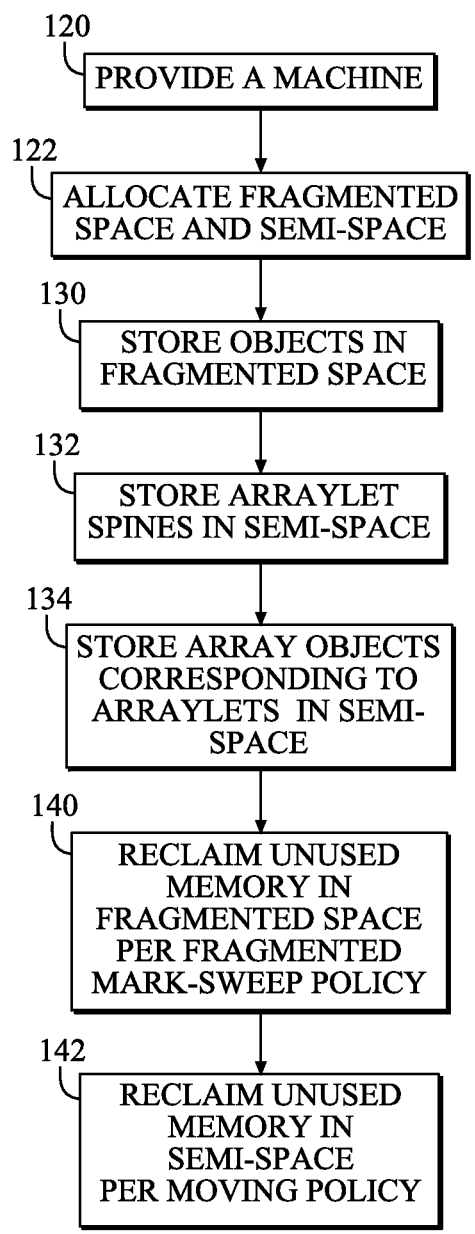
FIG. 5 is a high level flowchart of a method for reclaiming memory according to one embodiment of the invention.

FIG. 5 is a high-level flowchart of a method for reclaiming memory according to one embodiment of the invention. The method begins at step 120 when a machine is provided comprising the components described with reference to FIG. 3. Before collection beings, at step 122 heap memory is allocated from memory storage and a first space and two semi-spaces are allocated. At step 130 objects 20 are stored in the first space, and at steps 132, 134 objects 22 are stored in spines in semi-space and as chunks 30 in the first space. At this point it should become evident that an application needs instruction to be able to store objects 22 in the first space and semi-space. Also, the application needs instruction to operate concurrently with collector 100 so as to not introduce a pause or delay which is undesirable in real-time systems. The manner in which instruction is provided to the application is described later with reference to FIGS. 12 to 14. At this time, it is sufficient to recognize that the above-described variables provide a mechanism for application 50 to track the phases of collector 100, and that the phases are designed to allow cooperation and prevent malfunctions in either the operation of application 50 or collector 100. At step 140 the mark-sweep policy is implemented to reclaim heap memory in the first space. At step 142 the moving policy is implemented to reclaim memory in the active semi-space. Mark-sweep and moving policies are well known in the art of memory management and so it is not necessary to describe them here.

Figure 6:
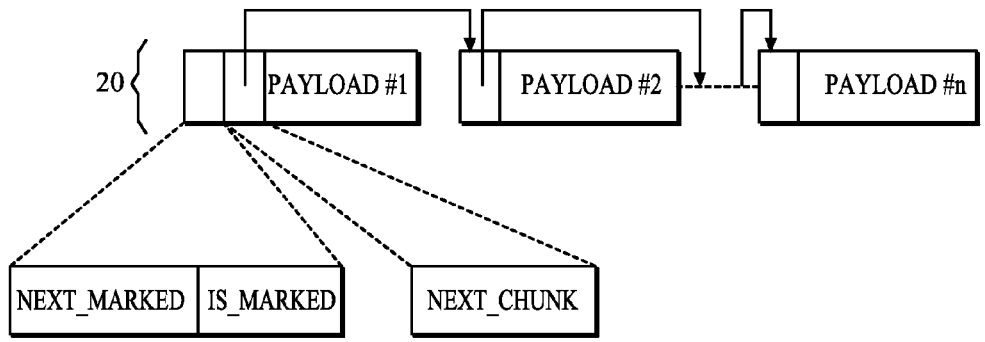
FIG. 6 illustrates an object fragmented into chunks 1 to n.
Figure 7:
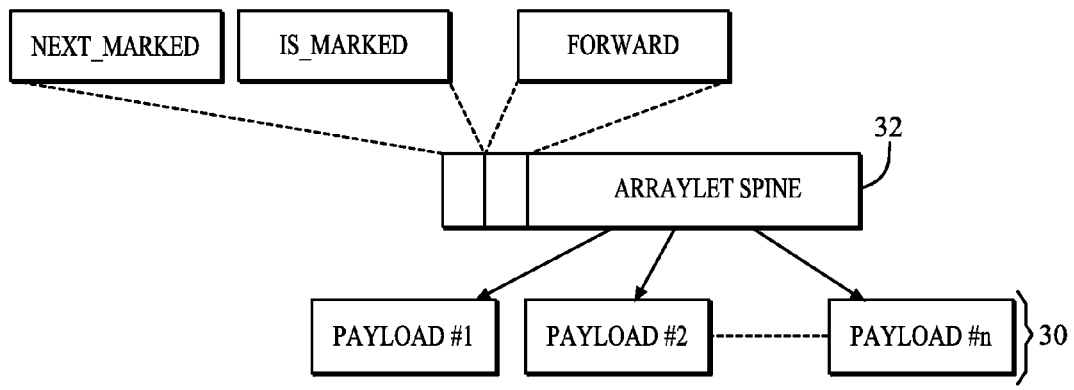
FIG. 7 illustrates an object transformed into a spine and a plurality of object elements according to another embodiment of the invention.
Figure 8:
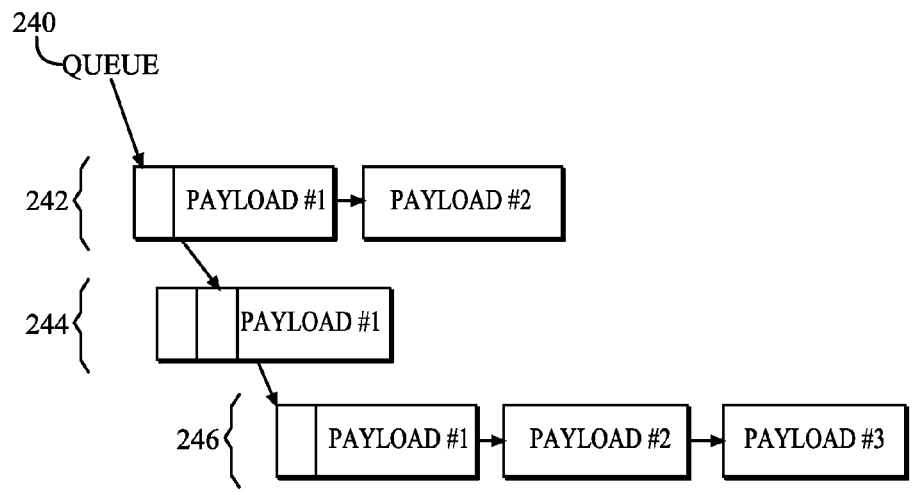
FIG. 8 illustrates a queue used by the collector of FIG. 1 to mark objects in a first space.

FIGS. 6 to 8 are block diagrams conceptually illustrating relationships between objects and the above-described variables. The relationships will be described with reference to exemplary algorithms described below. The algorithms and block diagrams refer to objects and their associated data structures. A reference to an object includes data structures added by the collector. The data structures typically comprise one machine word placed adjacent to the object by the collector. The application is given a reference to the object and knows how to access its payload. Advantageously, the data structures facilitate interaction between the application and the collector to prevent data corruption and facilitate expeditions reclaiming of unused memory. The application needs to know when it is appropriate to access object chunks. Because the collector reclaims semi-space memory by copying, the application needs to know which of two semi-spaces are active to thereby access the active semi-space. The collector sweeps unused memory in the first space after marking used memory using stacks. Without the data structures and the variables stored therein, if the application adds objects to the first space after the collector began marking, the collector may be unable to recognize the new objects and therefore may be unable to sweep them, in which case memory usage will increase out of control until the system crashes. Advantageously, by facilitating interaction between the application and the collector, the inventive system described herein prevents out-of-control memory usage without the requisite long application pauses generated by prior art collectors, and the advantages are achieved with restricted memory spaces. By restricted memory spaces it is meant that the semi-space allocations are a fraction of the first space, and the fraction is predictable based on a number of system characteristics defined below.

A prior art moving collector requires overhead equal to the size of the object stored. In the hybrid collector, small objects only require a minimal amount of overhead for linking chunks. Objects having a size equal to the chunk size require no linking overhead. Objects having a size equal to two chunks require one link. Since the distribution of small objects is weighed, typically, towards objects of 64-byte size or smaller, linking overhead is negligible. The semi-space overhead for arrays equals:

$$(\text{size of pointer to chunk}) \times (\text{size of array}) / (\text{size of chunk})$$

Thus, the ratio of the pointer size to the chunk size defines a lookup table size which is a fraction of the array size. For example, if the hybrid fragmenting collector splits data into 32-byte chunks and pointers are 4 bytes, the size of the lookup table will be ⅛ the size of the array. The lookup table itself is not fragmented; it is stored using a moving policy. This allows the lookup table to be contiguous in memory; thus, accesses to the lookup table do not require searching. Hence, whereas the overhead of a purely moving collector would be 100% of the size of the objects stored, the overhead of the hybrid collector is at most 1.25-fold, or 25%, if all objects stored are arrays and less as the ratio of small objects to arrays increases. The size reduction may be reduced further by optimizing the chunk size. It is envisioned that as the data bus sizes continue to increase, future systems may utilize 64 and 128-byte chunks which would further reduce the size of the semi-space overhead. Thus, depending on the number of arrays in memory and the size distribution of small objects, space overhead will vary between 0% (no overhead) and 25% (all objects are arrays). For clarity, overhead refers to the space required to implement the collection policy. The total memory required equals the size of the objects stored plus overhead. Advantageously, the hybrid collector requires a small amount of overhead to overcome the limitations of prior art mark-sweep and semi-space collectors.

FIG. 6 illustrates object 20 comprising chunks 1 to n, each chunk including a "payload". The first, or root, chunk includes a machine word containing the fields IS_MARKED, NEXT_MARKED and NEXT_CHUNK. An object is marked once it is known to the collector. At the end of collection in the first space, all unmarked objects are deleted and the space they used is reclaimed for other uses. IS_MARKED is a one-bit boolean field which indicates that an object has been marked. NEXT_MARKED contains a reference to the next marked object and is used for the collector's queue, e.g., the QUEUE will point to some marked object which will then point to the next one using NEXT_MARKED. NEXT_MARKED may be 0 if there are no further objects in the queue. NEXT_CHUNK points to the next chunk for the object thereby implementing a linked list. It may be 0 if this is the last chunk for that object.

FIG. 7 illustrates spine 32 and chunks 30 comprising chunks 1 to n, each chunk including a "payload". FORWARD is a pointer that will point to the spine's new location in the other semi-space when the arraylet spine is moved from one semi-space to the other according to the moving policy. Otherwise, the FORWARD pointer will point to the spine itself, i.e., it will self-point. Self-pointing is an optimization/convenience equivalent to making a FORWARD pointer have a zero value. As will be seen in the algorithms, having the FORWARD field self-point such that OBJECT.FORWARD=OBJECT makes the algorithm less complex.

FIG. 8 illustrates a queue used by the collector to mark objects in the first space. A queue may also be used to move objects in semi-space. Queue 240 is shown including three objects. Object 242 is fist having two chunks, then object 244 having one chunk, and finally object 246 having three chunks. Objects and arrays may themselves be made up of two different kinds of payloads: references and primitives. Some objects or arrays will contain references to other objects or arrays. The collector needs to know when references are modified. Primitives encompass any kind of data stored in memory that is not a reference. Primitives may include text, integers, floating point numbers and booleans.

Figure 9:
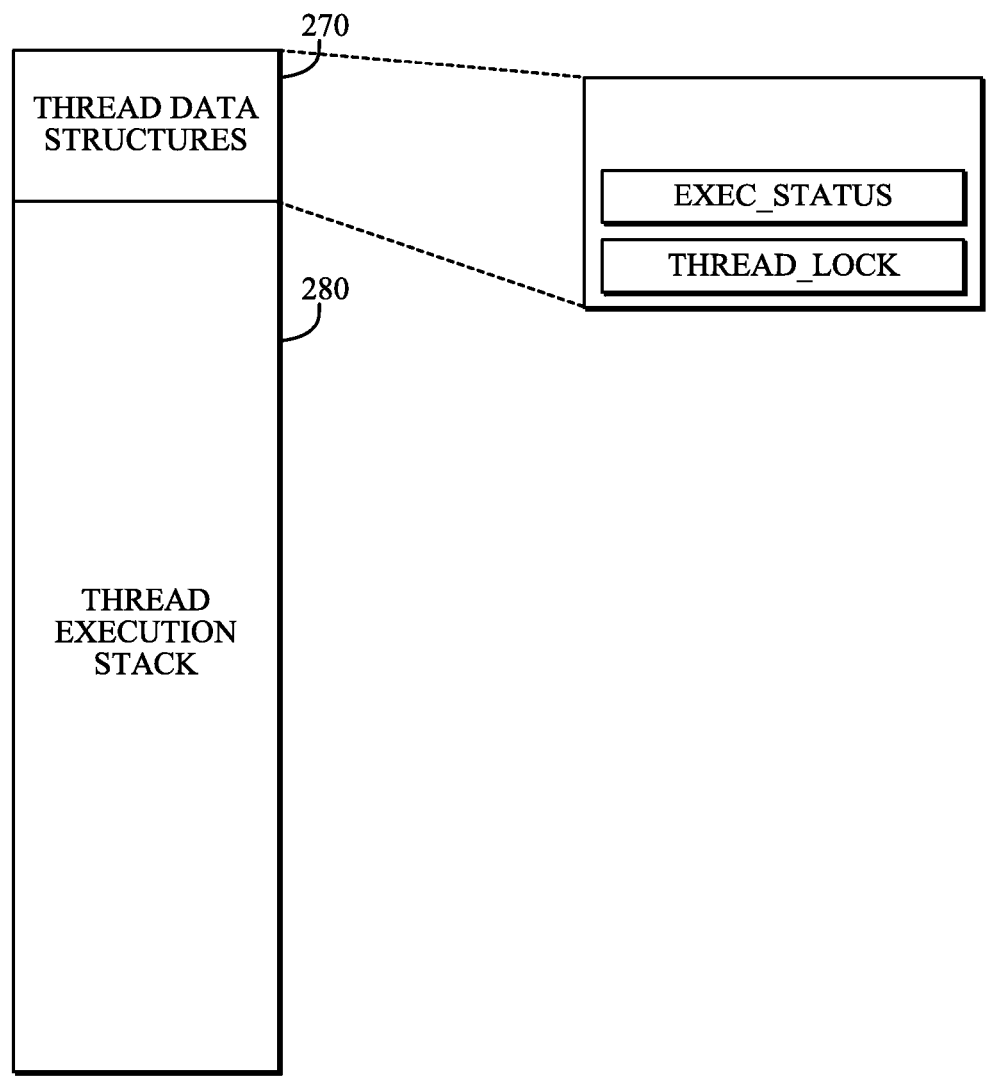
FIG. 9 illustrates conceptually a thread stack and related variables.

FIG. 9 illustrates conceptually a thread stack and related variables. The thread stack is allocated in bootstrap memory which is outside of heap memory. Bootstrap memory is not managed by the collector. The thread stack may include thread data structures 270 and thread execution stack 280. Thread data structures 270 may be allocated at the top of the stack though logically they are treated separately.

Exemplary algorithms are listed below for accessing and modifying heap memory. The algorithms are described in the Pascal language because Pascal language instructions provide a modicum of context and explanation which facilitates description of the invention and is well-known to persons having skill in the art of memory management. The functionality of the embodiments of the invention described herein may be implemented in any particular language and may be coded, preferably, in a lower-level language such as C. Additionally, the algorithms follow the conventions described hereinbelow. It should be understood that changing the assumptions implicit in the conventions would require changing constants in the algorithms.

'RESULT:=value' denotes setting the return value of a procedure that returns a value (a so-called "function" in Pascal terminology).

Variables are not declared, except for parameters to procedures.

Machine words are 32 bits, consisting of 4 8-bit bytes.

All variables are assumed to be one machine word integers and suitable for storing pointers to the heap.

Memory addresses are assumed to refer to bytes, not words. If PTR references a word, then PTR+4 will reference the word after it (PTR plus 4 bytes is the same as PTR plus 1 word).

Chunks in the mark-sweep space are 32 bytes (or 8 machine words).

VALUE[INDEX] indicates either a store or a load (depending on whether the expression occurs on the left or right-hand side of an ':=', respectively) to an offset INDEX from VALUE, where INDEX counts machine words. I.e., VALUE[1] indicates a load or a store to the location VALUE+4. All fields in objects and in arrays are one machine word wide.

VALUE.FIELD indicates an access (load or store) to a named field.

LOCK( ) and UNLOCK( ) are either hardware or software primitives for acquiring and releasing a lock.

CUR_THREAD always gives the thread data structure for the currently executing thread.

"-" indicates a comment

Exemplary algorithms are listed below for accessing and modifying heap memory. The implementations of the following algorithms are given further below:

```
ALLOCATE_OBJECT(SIZE)
ALLOCATE_ARRAY(SIZE)
MARK( )
STORE_FIELD(TARGET, FIELD, SOURCE)
STORE_REF_FIELD(TARGET, FIELD, SOURCE)
LOAD_FIELD(TARGET, FIELD)
STORE_ARRAY(TARGET, INDEX, SOURCE)
STORE_REF_ARRAY(TARGET, INDEX, SOURCE)
LOAD_ARRAY(TARGET, INDEX)
SAFEPOINT( )
LEAVE_HEAP( )
ENTER_HEAP( )
```

The collector will internally use the following algorithms:

```
ALLOC_CHUNK( )
SYNCHRONIZE( )
FLIP( )
SCAN_THREAD_ROOTS( )
SCAN_GLOBAL_ROOTS( )
TRANSITIVE_CLOSURE( )
SWEEP( )
NOTIFY_DONE( )
```

The following ALLOCATE_OBJECT( ) procedure allocates small objects from the heap. First the number of chunks required for the object are calculated, then each chunk is allocated using the ALLOC_CHUNK( ) method. The chunks are linked together using the NEXT_CHUNK field, and the object is set to be marked if the collector is tracing or sweeping to ensure that newly allocated objects are not swept up by the collector. Unless new objects are marked during tracing or sweeping, the trace may not see these new objects and, if not marked, they may be deleted. In another embodiment, the algorithm is optimized by not marking objects allocated in a region of the heap already swept. This may further optimize the FLIP algorithm. Objects may be not marked in other specific instances where not marking will not cause the objects to be deleted. In a further embodiment, this procedure may be improved by using rotating mark bits, where IS_MARKED=1 does not mean marked; instead it indicates the "cycle" in which the object was allocated. Therefore the meaning of IS_MARKED "flips" (or "rotates") on each collection.

```
ALLOCATE_OBJECT(SIZE)
NUM_CHUNKS := (SIZE+31)/32
RESULT := ALLOC_CHUNK( )
CURRENT_CHUNK := RESULT
FOR I = 2 TO NUM_CHUNKS
    NEXT_CHUNK := ALLOC_CHUNK( )
    CURRENT_CHUNK.NEXT_CHUNK := NEXT_CHUNK
    CURRENT_CHUNK := NEXT_CNUNK
END FOR
RESULT.NEXT_MARKED := EMPTY
IF GC_PHASE = TRACE OR GC_PHASE = SWEEP
    RESULT.IS_MARKED := 1
```

```
    ELSE
        RESULT.IS_MARKED := 0
    END IF
    RETURN RESULT
    ALLOC_CHUNK( )
    LOCK(GC_LOCK)
    WHILE NEXT_FREE = 0
        UNLOCK(GC_LOCK)
        LEAVE_HEAP( )
        WAIT UNTIL GC_PHASE = "IDLE"
        ENTER_HEAP( )
        LOCK(GC_LOCK)
    END WHILE
    RESULT := NEXT_FREE
    NEXT_FREE := RESULT.NEXT_CHUNK
    UNLOCK(GC_LOCK)
    RETURN RESULT
```

The following ALLOCATE_ARRAY( ) procedure allocates an array. It does so by first allocating all of the chunks, then the spine, and then storing the references to the chunks into the spine. The spine cannot be collected until after this procedure completes. This is ensured by the lack of any safepoints (LEAVE_HEAP( ), SAFEPOINT( )) between when the allocation of the spine completes and when the procedure returns its result. In an alternative embodiment, this procedure may be optimized by using hardware synchronization in place of the GC_LOCK when manipulating SS_BUMP.

```
    ALLOCATE_ARRAY(SIZE)
    NUM_CHUNKS := (SIZE+31)/32
    CUR_CHUNK = 0
    FOR I = 1 TO NUM_CHUNKS
        NEXT_CHUNK := ALLOC_CHUNK( )
        NEXT_CHUNK.NEXT_CHUNK := CUR_CHUNK
        CUR_CHUNK := NEXT_CHUNK
    END FOR
    SPINE_SIZE := NUM_CHUNKS*4
    LOCK(GC_LOCK)
    WHILE SS_REMAINING−SPINE_SIZE < 0
    UNLOCK(GC_LOCK)
    LEAVE_HEAP( )
    WAIT UNTIL GC_PHASE = "IDLE"
    ENTER_HEAP( )
        LOCK(GC_LOCK)
    END WHILE
    RESULT := SS_BUMP
    SS_BUMP := RESULT + SPINE_SIZE
    SS_REMAINING := SS_REMAINING − SPINE_SIZE
    UNLOCK(GC_LOCK)
    RESULT.FORWARD := RESULT
    RESULT.NEXT_MARKED := EMPTY
    IF GC_PHASE = TRACE
        RESULT.IS_MARKED := 1
    ELSE
        RESULT.IS_MARKED := 0
    END IF
    FOR I = 0 TO (NUM_CHUNKS−1)
        RESULT[2+I] := CUR_CHUNK
        CUR_CHUNK := CUR_CHUNK.NEXT_CHUNK
    END FOR
    RETURN RESULT
```

The following MARK( ) procedure marks an object. This makes the object known to the collector, causing it to (A) not be deleted in the sweep phase, and (B) be traced for additional references to other objects during the TRANSITIVE_CLOSURE.

```
    MARK(TARGET)
    IF (GC_PHASE = "INIT" OR GC_PHASE = "TRACE") AND
        NOT SOURCE.IS_MARKED
    LOCK(GC_LOCK)
    IF NOT SOURCE.IS_MARKED
        SOURCE.IS_MARKED := TRUE
        SOURCE.NEXT_MARKED := QUEUE
        QUEUE := SOURCE
    UNLOCK(GC_LOCK)
    END IF
```

The compiler will add code to the application source code to invoke the following STORE_FIELD( ) procedure anytime that a "primitive" field is modified. TARGET denotes the target object, FIELD denotes the field, and SOURCE denotes the new value. Once the compiler inserts a call to this procedure and inlines it, the FOR loop will likely be unrolled, provided that it is deemed beneficial by the optimizer. Inlining is described with reference to FIGS. 12 to 13.

```
    STORE_FIELD(TARGET, FIELD, SOURCE)
    CHUNK_ID := FIELD/32
    OFFSET := FIELD mod 32
    FOR I = 1 TO CHUNK_ID
        TARGET := TARGET.NEXT_CHUNK
    END FOR
    TARGET[OFFSET/4] := SOURCE
```

The compiler will modify the application to invoke the following STORE_REF_FIELD( ) procedure anytime that a reference field (i.e. a field that constitutes a reference to another heap location) is modified. The use of the GC_LOCK may be removed by using a thread-local QUEUE variable, and using hardware synchronization on IS_MARKED and NEXT_MARKED. This procedure exemplifies an implementation using the well-known "Dijkstra barrier". It could alternatively use the Yuasa barrier, or a combination of Dijkstra and Yuasa. Furthermore, this procedure contains a check to see if the source object is an array. In most cases, the compiler will know if the source object is an array or not and the compiler will then remove the check so that it does not appear in the compiled code.

```
    STORE_REF_FIELD(TARGET, FIELD, SOURCE)
    MARK(SOURCE)
    IF SOURCE IS ARRAY
        STORE_FIELD(TARGET, FIELD, SOURCE.FORWARD)
    ELSE
        STORE_FIELD(TARGET, FIELD, SOURCE)
    END IF
```

As above, the compiler will modify the application to invoke the following LOAD_FIELD( ) procedure anytime a field (primitive or reference) is read.

```
    LOAD_FIELD(TARGET, FIELD)
    CHUNK_ID := FIELD/32
    OFFSET := FIELD mod 32
    FOR I = 1 TO CHUNK_ID
        TARGET := TARGET.NEXT_CHUNK
    END FOR
    RETURN TARGET[OFFSET/4]
```

Similarly, the following procedures may be used to access array elements.

```
STORE_ARRAY_ELEMENT(TARGET, INDEX, SOURCE)
    CHUNK := TARGET[2+INDEX/8]
    CHUNK[INDEX mod 8] := SOURCE
LOAD_ARRAY_ELEMENT(TARGET, INDEX, SOURCE)
    CHUNK := TARGET[2+INDEX/8]
    RETURN CHUNK[INDEX mod 8]
STORE_REF_ARRAY_ELEMENT(TARGET, INDEX, SOURCE)
    MARK(SOURCE)
    IF SOURCE IS ARRAY
        STORE_ARRAY_ELEMENT(TARGET, INDEX,
        SOURCE.FORWARD)
    ELSE
        STORE_ARRAY_ELEMENT(TARGET, INDEX, SOURCE)
    END IF
```

The compiler will modify the application to invoke the following procedure periodically, such that the time between invocations is bounded by a user-determined constant. This "safepointing" technique is common in all modern Java implementations. The safepoint is used by the collector to ensure that when SYNCHRONIZE( ) is called, each thread will reach a safepoint (i.e. complete any allocations or stores that it was doing), and ensures acknowledgement that the threads have noticed a new value of GC_PHASE. Additionally, YIELD_TO_GC implements other functionality, such as stack scanning.

```
SAFEPOINT( )
    IF CUR_THREAD.EXEC_STATUS == SHOULD_YIELD
        YIELD_TO_GC(CUR_THREAD)
    END IF
```

The following procedure, which is only called from SAFEPOINT( ) and only when the safepoint notices the value SHOULD_YIELD in the thread's EXEC_STATUS, notifies the collector that the thread has reached a safepoint (by storing HEAP_ACCESS into THREAD.EXEC_STATUS), and optionally scans the thread's stack. Note that stack scanning occurs multiple times during collection—once at the beginning of collection, and potentially multiple times, repeatedly, during the TRANSITIVE_CLOSURE. This ensures that any references newly loaded onto the thread stacks are noticed. This approach ensures high performance while still having bounded cost. However, should the implementor determine that the cost of rescanning stacks is too high, this algorithm may be modified to use black-stack sliding views with a combined Dijkstra and Yuasa barrier.

```
YIELD_TO_GC(THREAD)
    LOCK(THREAD.THREAD_LOCK)
    IF GC_PHASE = "TRACE"
        FOR ALL (heap pointers on THREAD's stack)
            MARK(heap pointer)
        END FOR ALL
    END IF
    THREAD.EXEC_STATUS := HEAP_ACCESS
    UNLOCK(THREAD.THREAD_LOCK)
```

The following procedure is called whenever the application wishes to leave the heap. This may occur whenever the application is waiting on an event (and thus safepoints will not be reached in a timely fashion) or else calls a procedure not written in Java. Calls to this procedure are typically inserted by the compiler automatically whenever such events or calls are noticed by the compiler's analysis, but it may also be made available to the user directly.

```
LEAVE_HEAP( )
    LOCK(CUR_THREAD.THREAD_LOCK)
    CUR_THREAD.EXEC_STATUS := CLEAR
    UNLOCK(CUR_THREAD.THREAD_LOCK)
```

The following procedure is the converse of LEAVE_HEAP( ), and is used when the application wishes to regain access to the heap.

```
ENTER_HEAP( )
    LOCK(CUR_THREAD.THREAD_LOCK)
    CUR_THREAD.EXEC_STATUS := HEAP_ACCESS
    UNLOCK(CUR_THREAD.THREAD_LOCK)
```

Figure 10:
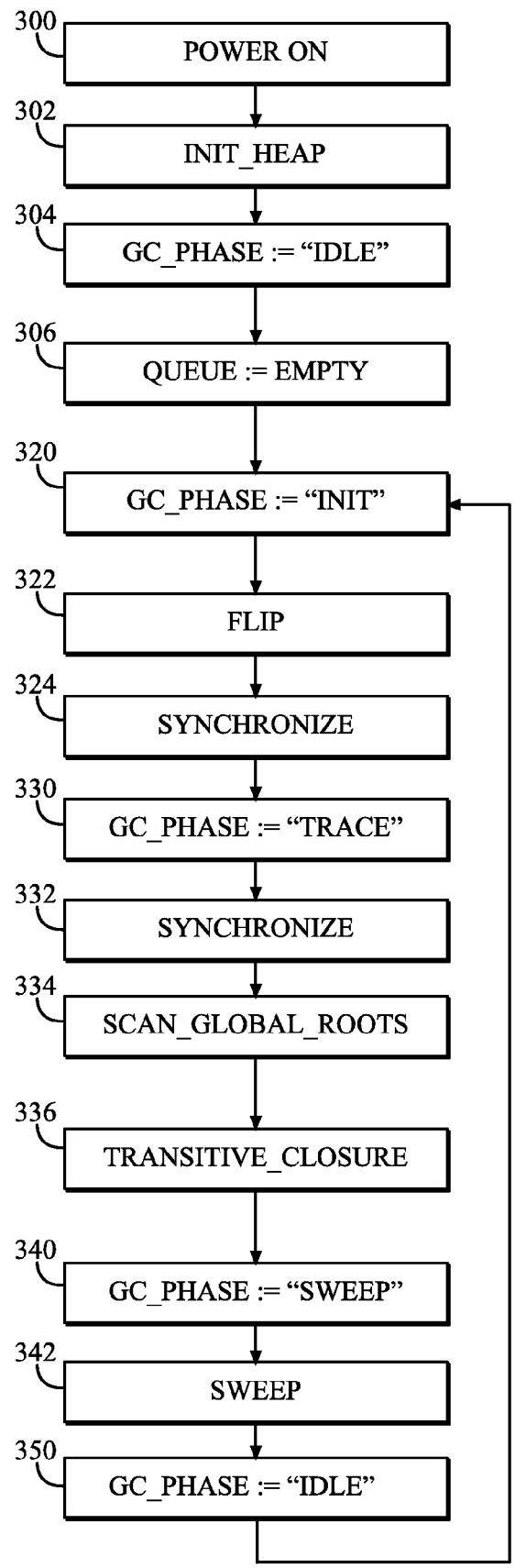
FIG. 10 illustrates collector processing sequences for reclaiming memory portions according to one embodiment of the invention.

FIG. 10 illustrates a collection processing sequence according to one embodiment of the invention. The collection processing sequence incorporates the procedures described above and additional procedures to implement the fragmenting mark-sweep policy and the moving policy. The collection processing sequence starts at 300 when the system is powered-on. Steps 302-316 initialize the collector. At 302, the heap is initialized, and at 304 the variable GC_PHASE is set to "idle". At 306 the variable QUEUE is set to "empty". At 320 the phase of the collector changes to "init" to start collection. Collection may start for any number of reasons. In one embodiment, a predetermined amount of memory usage, e.g. 80%, triggers collection. In another embodiment, collection is scheduled for a time of day, for example. In a further embodiment, collection is triggered by an event related to the functionality of the machine. In a phone application, for example, a triggering event may comprise a loss of signal together with high battery charge level so that collection occurs when power is available and reception is not so as to optimize memory when the device is essentially idle from a communications standpoint. In a weapons system, the event may be an alert level such as "no threat".

At 322, semi-spaces are flipped. Using the FLIP( ) procedure, for example, the collector prepares for a new collection cycle. It switches semi-space allocation to use the other space—the one not currently being used—by logically "flipping" the two spaces. It also unmarks all objects in the heap. Unmarking all objects can be optimized as discussed previously with reference to alternative embodiments using rotating mark bits or optimizing ALLOCATE_OBJECT( ) to not mark objects that have already been seen by the sweep phase.

```
FLIP( )
    LOCK(GC_LOCK)
    TMP = SS_START
    SS_START = SS_OTHER
    SS_OTHER = TMP
    SS_BUMP = SS_START
    UNLOCK(GC_LOCK)
    FOR (all objects in the heap)
        OBJECT.IS_MARKED = 0
        OBJECT.NEXT_MARKED = 0
    END FOR
```

At 324, the SYNCHRONIZE( ) procedure notifies all threads that it is waiting for them to reach a safepoint, and then waits for all of them to reach a safepoint. Threads that have relinquished heap access (using LEAVE_HEAP) are not waited on. The procedure is called multiple times by the collector, both directly and from the TRANSITIVE_CLOSURE procedure. If this procedure is invoked while GC_PHASE="TRACE", the threads' stacks will also be scanned. In an alternative embodiment of the invention, this procedure may be optimized, especially on multi-processors, by using a logarithmic barrier in the style of the REDUCE algorithm.

```
SYNCHRONIZE( )
    FOR ALL THREADS
        LOCK(THREAD.THREAD_LOCK)
        IF THREAD.EXEC_STATUS = HEAP_ACCESS
            THREAD.EXEC_STATUS := SHOULD_YIELD
        ELSE IF THREAD.EXEC_STATUS = CLEAR
            YIELD_TO_GC(THREAD)
        END IF
        UNLOCK(THREAD.THREAD_LOCK)
    END FOR
    WHILE (any thread has EXEC_STATUS = SHOULD_YIELD)
        WAIT
    END WHILE
```

At 330, the variable GC_PHASE is set to "trace" so the collector can find and mark new objects without conflicting with the application. Subsequently, at 334, the SCAN_GLOBAL_ROOTS( ) procedure scans all of the application's global variables for pointers into the heap.

```
SCAN_GLOBAL_ROOTS( )
    FOR (all global variables that contain pointers to the heap)
        MARK(global variable)
    END FOR
```

At 336, the TRANSITIVE_CLOSURE( ) procedure performs two related actions. First, the procedure marks all objects that are on the queue. This will cause the queue to grow further. This procedure repeatedly queries the queue until no new objects are marked. This procedure is guaranteed to terminate, since once an object has been marked it cannot be re-marked until the next collection cycle; i.e. in the worst case, this procedure will see all objects in the heap. This notion of placing previously unmarked objects on a queue, and marking the contents of objects removed from the queue, is one implementation of a process for finding the "transitive closure". Many other possible implementations exist; the one chosen here is simply known to be efficient. Second, the procedure copies array spines that are in the old space into the new space, and notifies that the copying occurred by setting the FORWARD pointer.

```
TRANSITIVE_CLOSURE( )
    WHILE QUEUE != EMPTY
        WHILE QUEUE != EMPTY
            LOCK(GC_LOCK)
            NEXT := QUEUE
            QUEUE := NEXT.NEXT_MARKED
            UNLOCK(GC_LOCK)
```

-continued
```
            IF NEXT IS ARRAY AND (NEXT < SS_START OR NEXT >=
SS_START + SS_SIZE)
                IF NEXT.FORWARD != NEXT
                    NEXT := NEXT.FORWARD
                ELSE
                    LOCK(GC_LOCK)
                    NEWNEXT := SS_BUMP
                    SS_BUMP := NEWNEXT + SIZE(NEXT)
                    UNLOCK(GC_LOCK)
                    NEWNEXT.IS_MARKED = 1
                    NEWNEXT.NEXT_MARKED = NEXT.NEXT_MARKED
                    NEXT.FORWARD=NEWNEXT
                    COPY from NEXT to NEWNEXT
                    NEXT = NEWNEXT
                END
            END IF
            FOR ALL (heap pointers in the object referenced by NEXT)
                MARK(pointer)
            END
        END WHILE
        SYNCHRONIZE
    END WHILE
```

At 336, the GC_PHASE variable is set to "sweep" and at 342 the SWEEP( ) procedure sweeps the heap looking for unmarked objects. Any objects that are unmarked are placed on the NEXT_FREE list. Objects that are marked and have pointers to arrays have their array pointers fixed up such that they point to the new space rather than the old space. Additionally, this algorithm resets the SS_REMAINING variable now that the collector does not need to perform any additional allocations.

```
SWEEP( )
    LOCK(GC_LOCK)
    SS_REMAINING := SS_START + SS_SIZE - SS_BUMP
    UNLOCK(GC_LOCK)
    FOR ALL (objects in the heap)
        IF OBJECT.IS_MARKED
            FOR ALL (array pointers in OBJECT)
                ARRAY_POINTER[0] := ARRAY_POINTER[0].FORWARD
            END
        ELSE
            LOCK(GC_LOCK)
            OBJECT.NEXT_CHUNK := NEXT_FREE
            NEXT_FREE := OBJECT
            UNLOCK(GC_LOCK)
        END IF
    END FOR
    FOR ALL (global roots that reference arrays)
        ROOT_POINTER[0] := ROOT_POINTER[0].FORWARD
    END
INIT_HEAP( )
    NEXT_FREE := 0
    FOR CHUNK = (base address of heap memory) TO (top address of
heap memory)
        CHUNK.NEXT_CHUNK := NEXT_FREE
        NEXT_FREE := CHUNK
    END FOR
    SS_START := (base address of semi-space #1)
    SS_OTHER := (base address of semi-space #2)
    SS_SIZE := (size of a semi-space)
    SS_BUMP := SS_START
    SS_REMAINING := SS_SIZE
```

At 330, the variable GC_PHASE is set to "idle" and the collector thus waits for a trigger to re-cycle.

Having described the operation of an exemplary embodiment of a hybrid collector according to the invention, the following sample program will exemplify the use of collector variables to facilitate cooperation between the collector and the sample program.

```
public class Sample {
    static Object foo;
    public static void main(String[ ] v) {
        for (;;) {
            Object[ ] array=new Object[1];
            array[0]="foo";
            foo=array[0];
        }
    }
}
```

FOO is a global variable and "foo" is a constant pointer to an immortal object. By immortal it is meant that it is stored in the application's code and is always marked and never swept.

```
MAIN( )
    LOOP
        ARRAY := ALLOCATE_ARRAY(1*4)
        STORE_REF_FIELD(ARRAY, 8+0*4, "foo")
        FOO := LOAD_FIELD(ARRAY, 8+0*4)
        SAFEPOINT( )
    END LOOP
```

Figure 11:
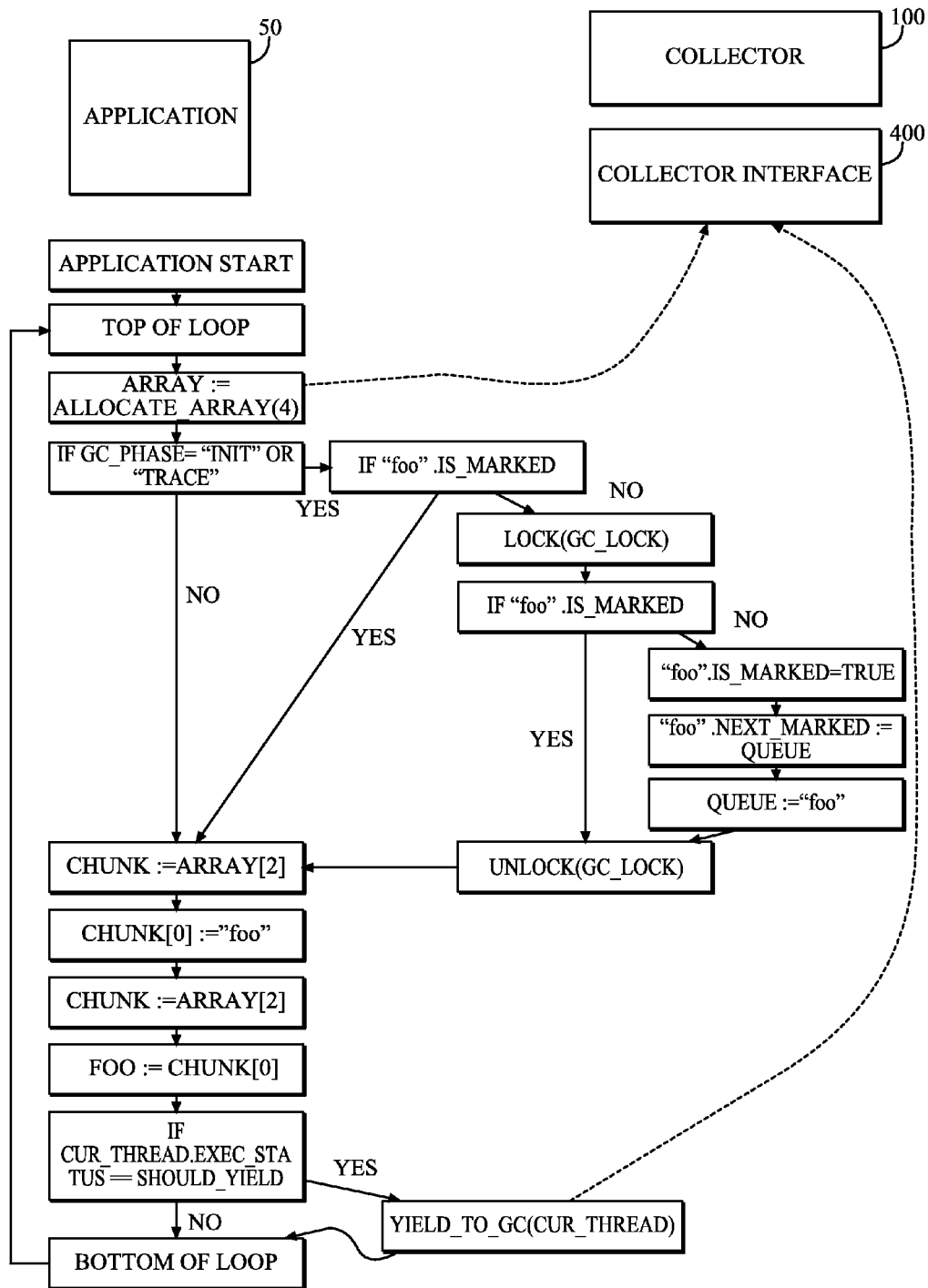
FIG. 11 is a flowchart illustrating cooperation between an application and a collector according to another embodiment of the invention.

Assuming a compiler outputs low-level code using the notation shown above and inlines stores, loads, and safepoints, the above code would be converted by the compiler's optimizer to the following procedure which is further illustrated with reference to FIG. 11.

```
MAIN( )
    LOOP
        ARRAY := ALLOCATE_ARRAY(4)
        IF (GC_PHASE = "INIT" OR GC_PHASE = "TRACE") AND
            NOT "foo".IS_MARKED
            LOCK(GC_LOCK)
            IF NOT "foo".IS_MARKED
                "foo".IS_MARKED := TRUE
                "foo".NEXT_MARKED := QUEUE
                QUEUE := "foo"
            UNLOCK(GC_LOCK)
        END IF
        CHUNK := ARRAY[2]
        CHUNK[0] := "foo"
        CHUNK := ARRAY[2]
        FOO := CHUNK[0]
        IF CUR_THREAD.EXEC_STATUS == SHOULD_YIELD
            YIELD_TO_GC(CUR_THREAD)
        END IF
    END LOOP
```

Figure 12:
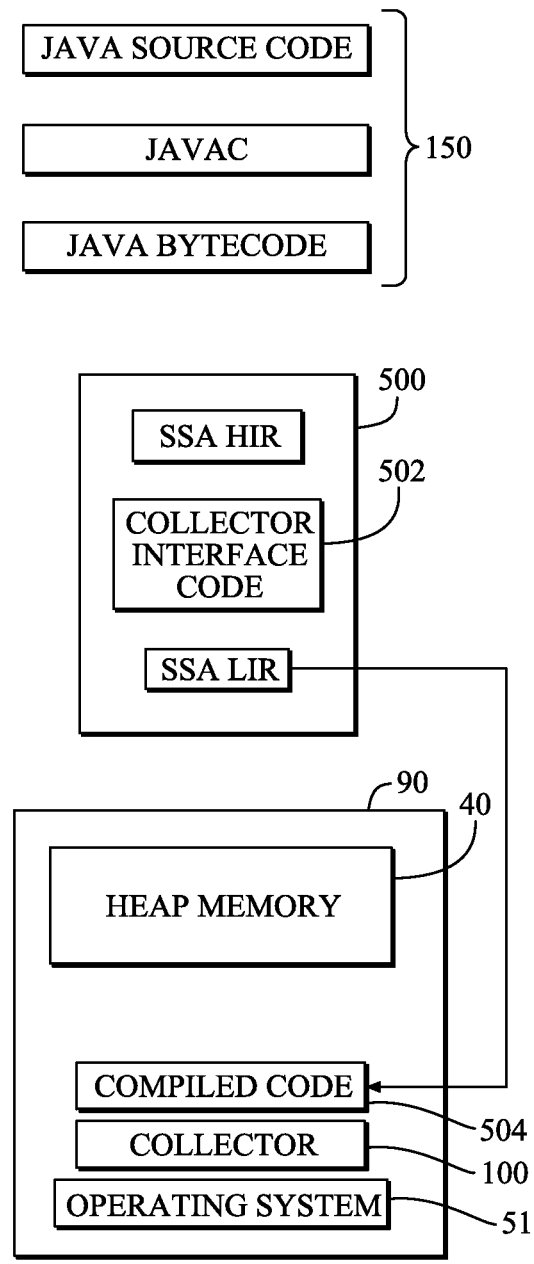
FIG. 12 is a block diagram illustrating a compiler operation to inline code.
Figure 13:
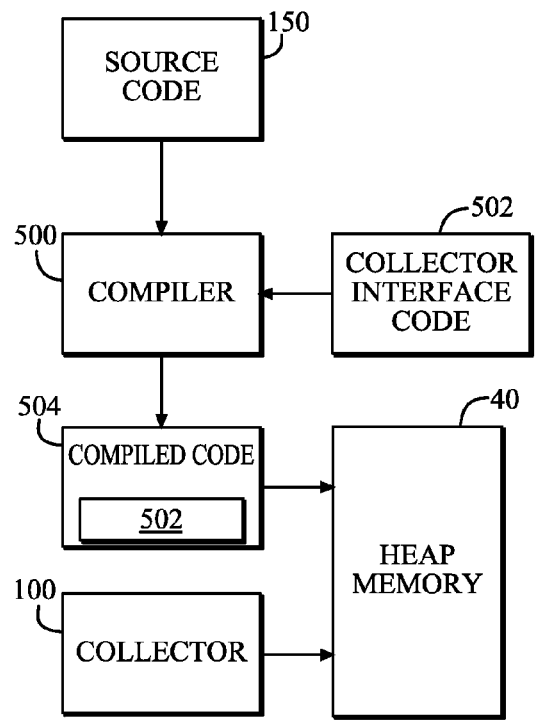
FIG. 13 is a block diagram illustrating inlined collector interface code.

Inlining was described above as a method for ensuring cooperation between applications and the hybrid collector and is described below in more detail with reference to FIGS. 12 to 13. FIG. 12 is a block diagram illustrating a compiler operation to inline code. In this exemplary embodiment, reference is made to Java source code although the concepts illustrated herein are not so limited and may be applied to any language. Numeral 150 denotes the provision of Java source code and use of the javac tool to read class and interface definitions to compile them into Java bytecode. Source code is provided to compiler 500 which typically represents variables in a SSA HIR form and subsequently a SSA LIR. Between SSA HIR and SSA LIR collector interface code 502 is introduced which will be inlined prior to production of machine code from the SSA LIR. Memory storage 90, as described previously, includes heap memory 40 and an application 50 which is now described as compiled code 504.

Memory source 90 may also include a collector 100 implemented in software and, as well, includes operating system 51. The operating system interfaces with the hardware and the compiled code to perform various functions coded into compiled code 504. Another depiction of code inlining is exemplified in FIG. 13 where compiled code 504 includes collector interface code 502. FIG. 13 illustrates that compiled code 504 and collector 100 both access heap memory 40.

Figure 14:
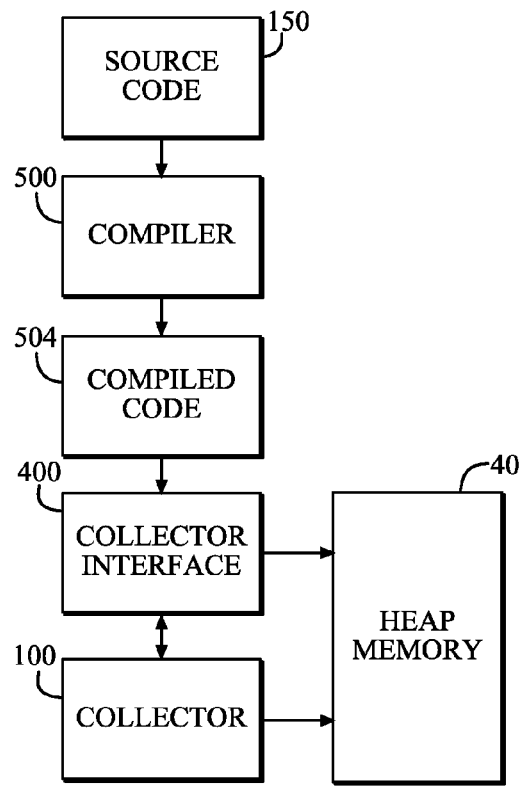
FIG. 14 is a block diagram illustrating a collector interface.

FIG. 14 is an alternative embodiment according to the invention of a method for allowing interaction between an application or compiled code 504 and collector 100. In this embodiment, compiler 500 does not inline code 502. Rather, a collector interface 400 is provided which translates compiled code 504 instructions so that they are compatible with operation of collector 100. Access to heap memory 40 is performed by collector interface 400 and collector 100. In this manner, compiled code 504 instructions pass through collector interface 400 where collector interface 400 produces the necessary arraylet access instructions and provides the resulting chunk payloads to compiled code 504 for further operation.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of managing memory, the method comprising the steps of:
    allocating a first space, a first semi space and a second semi space of a memory unit, the first space having a first space size, and the first and second semi spaces having a semi space size;
    transforming a first object comprising one of an array and an object larger than a predetermined size into a plurality of elements and a spine, the elements being equally sized, and the spine containing references to the plurality of elements;
    storing the plurality of elements in the first space and the spine in one of the first semi space and the second semi space;
    storing a second object in the first space, the second object being smaller than the predetermined size, the second object being fragmented into chunks having a chunk size if the second object is larger than the chunk size, the chunks being related by pointers having a pointer size;
    reclaiming first memory portions of the first space using a mark sweep policy; and
    reclaiming second memory portions of one of the first semi space and the second semi space using a moving policy.

2. A method as in claim 1, further including transforming the second object into a second spine and a second plurality of elements, storing the second plurality of elements in the first space, and storing the second spine in one of the first semi space and the second semi space.

3. A method as in claim 1, wherein in the storing the plurality of elements, elements are combined into chunks if they are smaller than the chunk size.

4. A method as in claim 1, wherein the semi space size is a fraction of a size of the plurality of first objects.

5. A method as in claim 4, wherein the semi space size is at most 25% of the size of the plurality of first objects.

6. A method as in claim 1, wherein in the storing the plurality of elements, elements are fragmented into chunks if they are larger than the chunk size.

7. A method as in claim 1, wherein an application accesses the first object and the second object without a wait-state.

8. A method as in claim 1, wherein in the storing the plurality of elements, elements are combined into chunks if they are smaller than the chunk size.

9. A method as in claim 1, wherein the semi space size is configured based on a ratio of the pointer size and the chunk size.

10. A method of managing memory, the method comprising the steps of:
allocating a first space, a first semi space and a second semi space of a memory unit, the first space having a first space size, and the first and second semi spaces having a semi space size configured based on a ratio of a pointer size and a chunk size;
transforming a first object into a plurality of elements and a spine, the elements being equally sized, and the spine containing references to the plurality of elements;
storing the plurality of elements in the first space and the spine in one of the first semi space and the second semi space, the elements being fragmented into chunks if the elements are larger than the chunk size;
reclaiming first memory portions of the first space using a mark sweep policy; and
reclaiming second memory portions of one of the first semi space and the second semi space using a moving policy.

11. A method as in claim 10, wherein the chunk size is 32 bytes, the pointer size is 4 bytes, and the ratio is 1/8.

12. A method as in claim 10, wherein an application accesses the first object and the second object without a wait-state.

13. A method as in claim 10, further comprising:
storing a second object in the first space, the second object smaller than the predetermined size;
transforming the second object into a second spine and a second plurality of elements;
storing the second plurality of elements in the first space; and
storing the second spine in one of the first semi space and the second semi space.

14. A method as in claim 10, wherein the semi space size is configured based on a ratio of the pointer size and the chunk size.

15. A machine having hard real-time processing capabilities, the machine comprising:
a memory unit having a first space, a first semi space and a second semi space allocated therein, the first space having a first space size, and the first and second semi spaces having a semi space size;
a first processing sequence configured to transform a first object into a plurality of equally sized elements and a spine, to store the plurality of elements in the first space, and to store the spine in one of the first semi space and the second semi space;
a second processing sequence configured to reclaim a first memory portion of the first space according to a mark sweep policy and a second memory portion of one of the first and the second semi spaces according to a moving policy; and
a third processing sequence configured to fragment the elements into chunks having a chunk size if the elements are larger than the chunk size, wherein the chunks are related by pointers having a pointer size.

16. A machine as in claim 15, wherein the first object comprises one of an array and an object larger than a predetermined size.

17. A machine as in claim 15, wherein the semi space size is a fraction of a size of the plurality of first objects.

18. A machine as in claim 17, wherein the semi space size is at most 25% of the size of the plurality of first objects.

19. A machine as in claim 18, wherein the machine comprises at least one of a vehicle, a communication device, and a weapon, and wherein the machine further includes an application for accessing the memory unit without a wait-state to control an output device.

20. A machine as in claim 15, wherein the machine comprises at least one of a vehicle, a communication device, and a weapon, and wherein the machine further includes an application for accessing the memory unit without a wait-state to control an output device.

21. A machine as in claim 15, wherein the machine comprises at least one of a vehicle, a communication device, and a weapon, having an output device operably controlled by the application, and wherein the second processing sequence is configured to reclaim the first memory portion of the first space without creating a wait-state.

22. A machine as in claim 15, wherein the semi space size is configured based on a ratio of the pointer size and the chunk size.

23. A machine as in claim 22, wherein the chunk size is 32 bytes, the pointer size is 4 bytes, and the ratio is 1/8.

24. A machine as in claim 15, further comprising a fourth processing sequence configured to combine the plurality of elements into chunks if the elements are smaller than the chunk size.

25. A computing device comprising:
a memory unit having a first space, a first semi space and a second semi space allocated therein, the first space having a first space size, and the first and second semi spaces having a semi space size;
a first processing sequence configured to transform a first object into a plurality of equally sized elements and a spine, to store the plurality of elements in the first space, and to store the spine in one of the first semi space and the second semi space, wherein the semi space size is a fraction of a size of the plurality of first objects;
a second processing sequence configured to reclaim a first memory portion of the first space according to a mark sweep policy and a second memory portion of one of the first and the second semi spaces according to a moving policy; and
a third processing sequence configured to fragment the elements into chunks having a chunk size if the elements are larger than the chunk size, wherein the chunks are related by pointers having a pointer size.

26. A computing device as in claim 25, wherein the first object comprises one of an array and an object larger than a predetermined size.

27. A computing device as in claim 25, wherein the semi space size is at most 25% of the size of the plurality of first objects.

28. A computing device as in claim 25, wherein the semi space size is configured based on a ratio of the pointer size and the chunk size.

29. A computing device as in claim 28, wherein the chunk size is 32 bytes, the pointer size is 4 bytes, and the ratio is 1/8.

30. A computing device as in claim 28, wherein the semi space size is configured as the ratio of the pointer size and the chunk size times an expected size of a plurality of first objects.

31. A computing device as in claim 25, further comprising a fourth processing sequence configured to combine the plurality of elements into chunks if the elements are smaller than the chunk size.

* * * * *